United States Patent [19]

Birk et al.

[11] 4,005,749
[45] Feb. 1, 1977

[54] OIL RECOVERY BY SURFACTANT WATERFLOODING

[75] Inventors: Silvia C. Birk, Fort Worth; Samuel H. Collins, Grand Prairie; Peggy M. Wilson, Dallas, all of Tex.

[73] Assignee: Mobil Oil Corporation, New York, N.Y.

[22] Filed: Nov. 11, 1975

[21] Appl. No.: 630,832

[52] U.S. Cl. .............................. 166/273
[51] Int. Cl.² ........................ E21B 43/22
[58] Field of Search ......... 166/273, 274, 270, 252

[56] References Cited
UNITED STATES PATENTS

| | | |
|---|---|---|
| 3,414,053 | 12/1968 | Treiber et al. ............... 166/273 |
| 3,437,141 | 4/1969 | Brandner et al. ............ 166/273 |
| 3,469,630 | 9/1969 | Hurd et al. ............... 166/273 X |
| 3,500,921 | 3/1970 | Abrams et al. ............ 166/273 |
| 3,589,444 | 6/1971 | Johnson et al. ............ 166/274 |
| 3,704,990 | 12/1972 | Sarem et al. ............ 166/273 |
| 3,788,399 | 1/1974 | Feuerbacher et al. ........ 166/274 |
| 3,844,350 | 10/1974 | Knight et al. ............ 166/274 X |

*Primary Examiner*—Stephen J. Novosad
*Attorney, Agent, or Firm*—C. A. Huggett; William D. Jackson

[57] ABSTRACT

A surfactant waterflooding process for the recovery of oil from subterranean oil reservoirs in which a water-soluble polyalkylene oxide is employed as a sacrificial agent in order to retard adsorption of the surfactant. An aqueous pretreatment slug is injected which contains a water-soluble polyalkylene oxide sacrificial agent having a molecular weight of at least 1200. Thereafter an aqueous slug containing a surfactant exhibiting a lower molecular weight than that of the polyalkylene oxide sacrificial agent is injected. The surfactant slug may also contain a polyalkylene oxide sacrificial agent as described above. In this case, concentration of sacrificial agent in the surfactant slug normally is lower than the concentration in the pretreatment slug.

5 Claims, 1 Drawing Figure

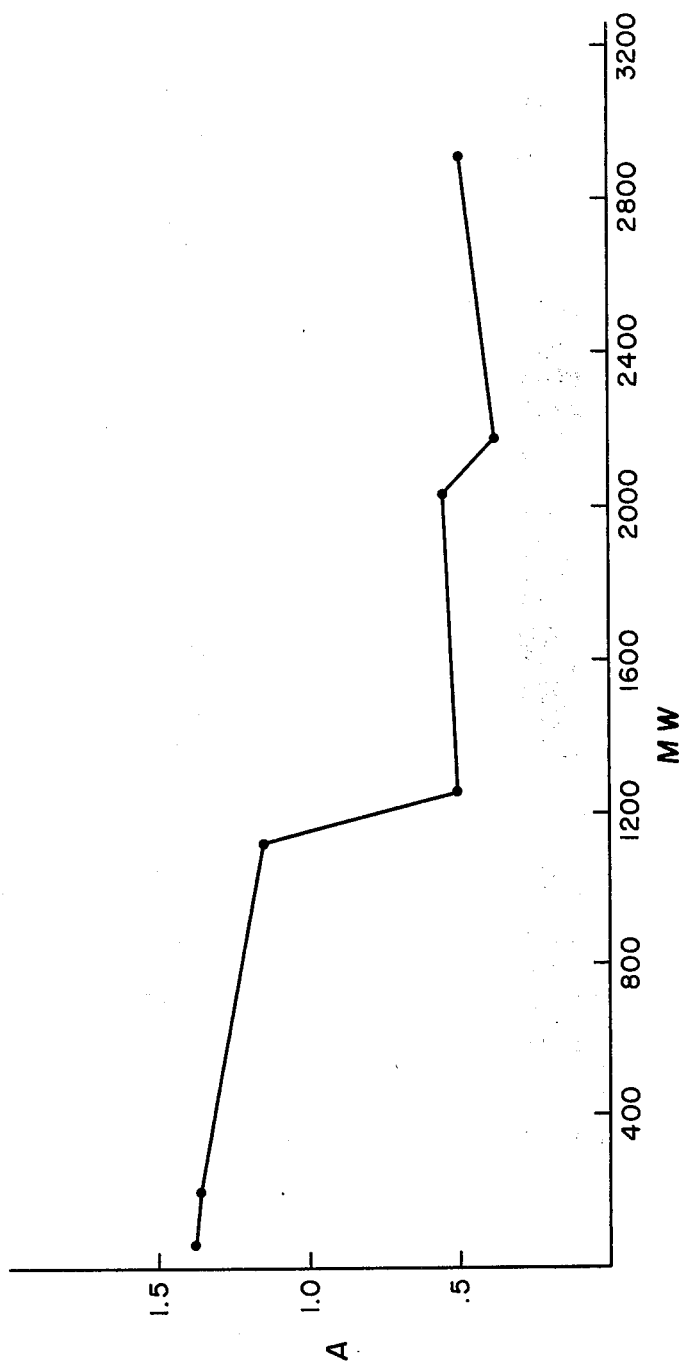

OIL RECOVERY BY SURFACTANT WATERFLOODING

BACKGROUND OF THE INVENTION

This invention relates to the recovery of oil from subterranean oil reservoirs and more particularly to improved waterflooding operations involving the injection of aqueous surfactant solutions in which polyalkylene oxide sacrificial agents are employed to reduce surfactant adsorption.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonates within a designated equivalent weight range and under controlled conditions of salinity. For example, in a paper by W. R. Foster entitled "A Low-Tension Waterflooding Process", JOURNAL OF PETROLEUM TECHNOLOGY, Vol. 25, February, 1973, pp. 205–210, there is disclosed a low tension waterflood process which involves the sequential injection of a protective slug, a surfactant slug, and a mobility control slug. The protective slug is an aqueous solution of sodium chloride which is injected in order to displace the reservoir waters ahead of the subsequently injected surfactant slug. This slug is substantially free of divalent ions which would tend to precipitate the subsequently injected surfactant. The rear portion of the protective slug normally contains an inorganic sacrificial agent such as sodium tripolyphosphate and/or sodium carbonate which acts to satisfy adsorption sites within the reservoir, thus decreasing absorption of the surfactant.

The surfactant slug comprises an aqueous solution of petroleum sulfonates exhibiting an average equivalent weight within the range of 350–500 and which contains sodium chloride in a concentration, typically about 1.0 to 2.0 weight percent, which will promote the desired low interfacial tension between the injected water and the reservoir oil. The surfactant slug also will normally contain a sacrificial agent such as described above. The subsequently injected thickened water slug contains a viscosifier such as a water-soluble biopolymer in a graded concentration in order to provide an initial viscosity greater than the viscosity of the reservoir oil and a terminal viscosity near that of water. Thereafter a driving fluid such as produced field brine is injected in order to carry the process to conclusion.

As noted previously, one limitation encountered in waterflooding with petroleum sulfonates, as well as with many other anionic surfactants, lies in the tendency of the sulfonates to precipitate from solution in the presence of even moderate concentrations of divalent metal ions such as calcium and magnesium ions. Normally it is considered that the aqueous surfactant solution should contain no more than perhaps 50 to 100 parts per million of such divalent metal ions. Another limiting factor present in the use of such surfactants is the fact that the desired low interfacial tensions can seldom be achieved, even in the absence of divalent metal ions, at salinities in excess of about 2 to 3 weight percent.

Many subterranean oil reservoirs contain formation waters having divalent metal ion concentrations and monovalent salt salinities well in excess of the values which can be tolerated by the petroleum sulfonate type surfactant systems. Similar considerations apply in many cases to the waters which may be available for injection purposes. Thus considerable effort has been devoted to the development of surfactant systems which may be employed in environments containing relatively high divalent metal ion concentrations and/or relatively high monovalent salt salinities. For example, U.S. Pat. No. 3,508,612 to Reisberg et al. is directed to a waterflooding process employing a calcium compatible surfactant system which is comprised of dissimilar anionic surfactants. A typical anionic surfactant system disclosed by Reisberg et al. comprises a petroleum sulfonate having a molecular weight within the range of 430–470 and a sulfated oxylated alcohol containing a $C_{12}$–$C_{15}$ alkyl group and from 3–9 ethylene oxide groups.

U.S. Pat. No. 3,792,731 to Feuerbacher et al. discloses an anionic-nonionic surfactant system for use in low tension waterflooding where the monovalent salt concentration is within the range of 0.5 percent to about 15.0 percent. Among the anionic surfactants disclosed in Feuerbacher et al. are petroleum sulfonates, alkyl sulfonates and sulfates, and sulfosuccinates. The various nonionic surfactants suggested by the patentees include the polyalkylene oxides such as polymers and copolymers of ethylene oxide and/or propylene oxide as well as ethoxylated thioethers, ethoxylated amines and ethoxylated alcohols and alkyl phenols.

Yet another anionic-nonionic surfactant system for use in low tension waterflooding is disclosed in U.S. Pat. No. 3,811,504 to Flournoy et al. This patent is directed to a three-component system containing two anionic surfactants and one nonionic surfactant which is said to be usable in environments exhibiting polyvalent ion concentrations of about 1,500 to 12,000 parts per million. In this procedure, one of the anionic surfactants is an alkyl or alkyl aryl sulfonate and the other is an alkyl polyethoxy sulfate. The nonionic surfactant includes polyethoxylated alkyl phenols in which the alkyl group has 5 to 20 carbon atoms with 6 to 20 polyethylene oxide groups and polyethoxylated aliphatic alcohols with an alkyl chain having 5 to 20 carbon atoms and again containing 6 to 20 polyethylene oxide groups. The Flournoy et al. patent also discloses that the surfactant slug may be preceded by sacrificial inorganic materials such as sodium carbonate or sodium polyphosphate.

Yet a further procedure for low tension waterflooding in the presence of high divalent and/or monovalent salt concentrations is disclosed in U.S. patent application Ser. No. 560,289, filed Mar. 20, 1975, by Silvia C. Birk. This procedure involves the injection of a multifunctional surfactant system comprising a surface-active amide-linked sulfonate anionic group and a surface-active polyethylene oxide nonionic group. Among the surfactants which may be employed in this process are disubstituted taurines such as sodium N-methyl-N-oleoyl-taurate available from General Aniline and Film Corporation under the trade name "Igepon T-33" and polyethoxylated alkyl phenols such as the polyethoxylated nonyl phenol available from General Aniline and Film Corporation under the trade name "Igepal CO-520".

SUMMARY OF THE INVENTION

In accordance with the present invention, there is provided a new and improved surfactant waterflooding process in which a water-soluble polyalkylene oxide is employed as a sacrificial agent in order to retard surfactant adsorption. In carrying out the invention, there is injected into a subterranean oil reservoir via a suitable injection system an aqueous pretreatment solution of a water-soluble polyalkylene oxide sacrificial agent having a molecular weight of at least 1200. Subsequent to injection of the pretreatment solution, an aqueous surfactant solution is injected into the reservoir. This solution contains a surfactant having a lower molecular weight than the molecular weight of the polyalkylene oxide sacrificial agent. Subsequent to the injection of the surfactant solution, an aqueous flooding medium is injected into the reservoir via the injection system in order to displace reservoir oil to a production system from which the oil is recovered.

A preferred application of the present invention is in situations in which one or both of the water in the reservoir or the water employed for injection of the surfactant exhibits a divalent metal ion concentration of at least 0.01 weight percent. The surfactant system employed in such an environment normally will include a nonionic surfactant and preferably will comprise a nonionic-anionic system.

BRIEF DESCRIPTION OF THE DRAWING

The drawing is a graph illustrating the effect of molecular weight of polyalkylene oxide sacrificial agents on surfactant adsorption.

DESCRIPTION OF SPECIFIC EMBODIMENTS

Low tension waterflooding procedures take advantage of the fact that by decreasing the interfacial tension between the injected flooding water and reservoir oil the microscopic displacement efficiency of the oil by the water is increased. All other things being equal, an increase in microscopic displacement efficiency is in turn accompanied by an increase in oil recovery. While theoretically any decrease in oil-water interfacial tension results in an increase in microscopic displacement efficiency, it is believed that most investigators would agree that this phenomenon ordinarily does not become significant until the oil-water interfacial tension is reduced to a value appreciably less than 0.1 dyne per centimeter. Preferably, the oil-water interfacial tension is reduced to a value of 0.003 dyne per centimeter or less in order to reach an "optimum" microscopic displacement efficiency.

By employing anionic surfactants such as petroleum sulfonates or synthetic alkyl aryl sulfonates, these extremely low interfacial tensions can be achieved in environments in which the monovalent salt salinity, principally sodium chloride, is relatively low. However, even moderate salinities, on the order of 3 percent by weight or more, normally preclude these low interfacial tensions. In addition, even small amounts of divalent ions will cause precipitation of the anionic surfactants, thus greatly reducing their effectiveness. When employing anionic surfactants, the divalent metal ion concentration normally should be less than 50-100 parts per million, and if it exceeds 300 to 500 parts per million the use of anionic surfactants alone is usually ineffective.

The aforementioned application Ser. No. 560,289 by Birk discloses multifunctional surfactant systems which comprise a mixture of certain nonionic surfactants and amide-linked sulfonates. As disclosed in the Birk application, these systems enable the attainment of low interfacial tensions over wide salinity ranges and in the presence of moderate to high divalent ion concentrations. The surfactant systems disclosed in the Birk application are, like other surfactant systems proposed for use in low tension waterflooding, subject to adsorption within the reservoir. The present invention provides a method whereby such surfactant adsorption can be alleviated even in the presence of divalent metal ions which would tend to precipitate the inorganic materials heretofore proposed for use as sacrificial agents. The sacrificial agents employed in the present invention are water-soluble polyalkylene oxides having a molecular weight of at least 1200. Such polyalkylene oxides include polyethylene glycol, polypropylene glycol, and copolymers of polyethylene glycol and polypropylene glycol. Aliphatic esters of these materials may be employed also so long as the aliphatic group does not render the polyalkylene oxide water-insoluble.

In laboratory experiments carried out relative to the present invention, adsorption tests were carried out for an anionic-nonionic surfactant system of the type disclosed in the aforementioned Birk application. The nonionic component in this system was Igepal CO-520 (polyethoxylated nonyl phenol containing an average of 5 ethylene oxide groups) and the anionic component was Igepon T-33 (sodium N-methyl-N-oleoyl-taurate).

The adsorption tests were carried out employing three different adsorbent materials; Bahama oolite, Berea sand, and a disaggregated reservoir sand. Mineralogical analysis of the Bahama oolite showed it to be composed of nearly 100 percent calcium carbonate in the aragonite form. The Berea sand was composed of 96.5 percent quartz, 0.7 percent illite, 2.2 percent kaolinite, 0.2 percent albite, and 0.4 percent microcline. The analysis of the reservoir sand showed that it comprised 22.7 percent quartz, 2.2 percent chert, 12.8 percent plagioclase, 15.6 percent unstable rock fragment, 8.2 percent calcium clasts, 3.3 percent potassium Feldspar, 0.5 percent glauconite, 12.2 percent calcium cement, and 18.4 percent clay cement. The reservoir sand also contained trace amounts of pyrite, illite, kaolinite and a somewhat greater amount of montmorillonite. The measured surface areas of the Bahama oolite, Berea sand, and reservoir sand were found to be 3.2, 1.5, and 12.3 square meters per gram, respectively.

Adsorption measurements were carried out under both static and dynamic conditions. In the static or "shake" tests, the aqueous surfactant solutions of varying concentrations as described hereinafter were placed in centrifuge tubes containing the adsorbent material. In the case of the Bahama oolite and the Berea sand, the adsorbent was initially disaggregated. In the case of the reservoir sand, the material was obtained from a core cleaned by a Soxhlet extraction procedure and then broken into small variable sized pieces. These became substantially disaggregated during the adsorption measurements. After placing the materials in the containers, the containers were agitated in a mechanical shaker, usually for 16 hours, in order to obtain static adsorption values. At the conclusion of the agitation, the containers were centrifuged and the supernatant solutions were analyzed for the amount of surfactant remaining in solution. From this, the static adsorption values were calculated.

In each case the surfactant solutions were prepared by dispersing the surfactants in distilled water and then adding brine to provide an 8 weight percent* brine solution. The solution contained 20,400 parts per million of sodium ion, 7,408 parts per million calcium ion, and 2,021 parts per million magnesium ion.

* In describing the present invention and the supporting laboratory data, weight percents are calculated on a weight (solute)/volume (solution) basis.

The results of these adsorption tests are reported in Tables I-A and I-B, II-A and II-B, and III. Each table presents the initial and final surfactant concentrations in parts per million, the amount of surfactant adsorbed in milligrams per square meter of surface area, and the initial and final ratios of the anionic T-33 to the nonionic CO-520. Tables I-A and I-B illustrate the results of the adsorption tests for the reservoir sand, Tables II-A and II-B for the Berea sand, and Table III for the Bahama oolites.

TABLE I-A

Reservoir Sand

| Initial Concentration, ppm | | | Final Concentration, ppm | | | Adsorption, mg/m$^2$ | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 610.6 | 411.3 | 1021.9 | 6.8 | 0 | 6.8 | 0.25 | 0.17 | 0.42 | 1.48 | — |
| 1178.7 | 802.1 | 1980.8 | 8.5 | 0 | 3.5 | 0.48 | 0.35 | 0.83 | 1.47 | — |
| 3086.7 | 1989.9 | 5076.6 | 780.2 | 238.7 | 1018.9 | 0.94 | 0.71 | 1.65 | 1.55 | 3.27 |
| 6190.4 | 4154.3 | 10344.7 | 3680.0 | 1736.0 | 5416.0 | 1.02 | 0.98 | 2.01 | 1.49 | 2.12 |
| 8395.0 | 5714.0 | 14109.0 | 6512.6 | 3004.8 | 9517.4 | 0.77 | 1.10 | 1.87 | 1.47 | 2.17 |
| 11872.0 | 8112.0 | 19984.0 | 9158.4 | 4875.7 | 14034.1 | 1.10 | 1.31 | 2.42 | 1.46 | 1.88 |
| | | | | | | | | Avg. 1.53 | | |

TABLE I-B

| 407.0 | 609.0 | 1016.0 | 3.4 | 4.0 | 7.4 | 0.16 | 0.25 | 0.41 | 0.67 | 0.85 |
|---|---|---|---|---|---|---|---|---|---|---|
| 788.6 | 1195.0 | 1983.6 | 8.5 | 4.6 | 13.1 | 0.32 | 0.48 | 0.80 | 0.66 | 1.85 |
| 1967.0 | 2975.0 | 4942.0 | 42.4 | 62.0 | 104.4 | 0.78 | 1.18 | 1.97 | 0.66 | 0.68 |
| 3901.0 | 5953.0 | 9854.0 | 2026.7 | 1840.1 | 3866.8 | 0.76 | 1.67 | 2.43 | 0.66 | 1.10 |
| 5258.0 | 8273.0 | 13531.0 | 3748.2 | 4270.5 | 8018.7 | 0.61 | 1.63 | 2.24 | 0.64 | 0.88 |
| 7632.0 | 11851.0 | 19483.0 | 6071.7 | 7559.9 | 13631.6 | 0.63 | 1.74 | 2.38 | 0.64 | 0.80 |
| | | | | | | | | Avg. 1.71 | | |

TABLE II-A

Berea Sand

| Initial Concentration, ppm | | | Final Concentration, ppm | | | Adsorption, mg/m$^2$ | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 610.6 | 411.3 | 1021.9 | 149.8 | 91.3 | 241.1 | 1.53 | 1.07 | 2.60 | 1.48 | 1.64 |
| 1178.7 | 802.1 | 1980.8 | 839.5 | 507.6 | 1347.1 | 1.13 | 0.98 | 2.11 | 1.47 | 1.65 |
| 3086.7 | 1989.9 | 5076.6 | — | — | — | — | — | — | 1.55 | — |
| 6190.4 | 4154.3 | 10344.7 | 5546.0 | 3869.6 | 9415.6 | 2.15 | 0.95 | 3.09 | 1.49 | 1.43 |
| 8395.0 | 5714.0 | 14109.0 | 7674.0 | 5082.0 | 12756.0 | 2.40 | 2.10 | 4.51 | 1.47 | 1.51 |
| 11872.0 | 8112.0 | 19984.0 | 10600.0 | 7415.0 | 18015.0 | 4.24 | 2.32 | 6.57 | 1.46 | 1.43 |
| | | | | | | | | Avg. 3.77 | | |

TABLE II-B

| 407.0 | 609.0 | 1016.0 | 90.5 | 115.3 | 205.8 | 1.05 | 1.65 | 2.70 | 0.67 | 0.78 |
|---|---|---|---|---|---|---|---|---|---|---|
| 788.6 | 1195.0 | 1983.6 | 483.4 | 685.1 | 1168.5 | 1.01 | 1.70 | 2.71 | 0.66 | 0.71 |
| 1967.0 | 2975.0 | 4942.0 | 1696.0 | 2447.8 | 4143.8 | 0.91 | 1.76 | 2.67 | 0.66 | 0.69 |
| 3901.0 | 5953.0 | 9854.0 | 3612.5 | 5489.9 | 9102.4 | 0.96 | 1.55 | 2.51 | 0.66 | 0.66 |
| 5258.0 | 8273.0 | 13531.0 | 5155.8 | 7800.1 | 12955.9 | 0.34 | 1.57 | 1.91 | 0.64 | 0.66 |
| 7632.0 | 11851.0 | 19483.0 | 7462.4 | 10648.0 | 18110.0 | 0.57 | 4.01 | 4.58 | 0.64 | 0.70 |
| | | | | | | | | Avg. 2.85 | | |

TABLE III

| Initial Concentration, ppm | | | Bahama Oolites Final Concentration, ppm | | | Adsorption, mg/m² | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 610.6 | 411.3 | 1021.9 | 517.3 | 566.2 | 1083.5 | 0.15 | 0 | 0.15 | 1.48 | 0.91 |
| 1178.7 | 802.1 | 1980.8 | 1127.8 | 993.0 | 2120.8 | 0.08 | 0 | 0.08 | 1.47 | 1.14 |
| 3086.7 | 1989.9 | 5076.6 | 2951.0 | 2220.4 | 5171.4 | 0.21 | 0 | 0.21 | 1.55 | 1.33 |
| 6190.4 | 4154.3 | 10344.7 | 5800.3 | 4175.1 | 9975.4 | 0.61 | 0 | 0.61 | 1.49 | 1.39 |
| 8395.0 | 5714.0 | 14109.0 | 8615.7 | 5510.6 | 14126.3 | 0 | 0.32 | 0.32 | 1.47 | 1.56 |
| 11872.0 | 8112.0 | 19984.0 | 12516.5 | 7791.1 | 20307.6 | 0 | 0.50 | 0.50 | 1.46 | 1.61 |
| | | | | | | | | Avg. 0.31 | | |

In Tables I-A, II-A, and III, the initial nominal ratio of T-33/CO-520 was 1.5 and in Tables I-B and II-B the initial nominal ratio of T-33/CO-520 was 0.67. From an examination of Table I-A, it can be seen that the total surfactant adsorption in column 9 ranged from a low of 0.42 milligram per square meter for an initial total surfactant concentration of 1021.9 parts per million (about 0.1 weight percent) to a maximum of 2.42 milligrams per square meter for initial surfactant concentration of about 2 weight percent. The average adsorption for the different concentrations reported (the average of column 9) is 1.53 milligrams per square meter for Table I-A and 1.71 milligrams per square meter for Table I-B. From an examination of the data presented in Tables I-A and I-B it can be seen that the ratio of the anionic to nonionic surfactant appears to have only a small impact upon the total surfactant adsorption.

Turning now to Tables II-A and II-B, it can be seen that surfactant adsorption was more severe for the tests run with the Berea sand. Also, the tests appear to indicate that the total amount of surfactant adsorbed was somewhat more sensitive to the ratio of anionic to nonionic surfactant components.

Table III shows the results of the adsorption experiments carried out employing Bahama oolites as the adsorbent. As reported in this Table, adsorption was very moderate, considerably less than 1 milligram per square meter for all of the initial concentrations tested up to about 2 weight percent. The average adsorption for the concentrations reported in Table III is 0.31 milligram per square meter. In Table III the anionic/nonionic surfactant ratio was 1.5. Experiments were not carried out for the reverse ratio because of experimental difficulties which are reflected by the data reported in Table III and become apparent from a comparison of columns 3 and 6. Finely divided solids in the Bahama oolites made it difficult to obtain accurate measurements and the results reported in columns 7, 8, and 9 represent simply best estimates.

A further suite of experiments was carried out in order to test the efficacy of the polyalkylene oxide sacrificial agents of the present invention in reducing adsorption of the Igepon T-33 — Igepal CO-520 surfactant systems. The various materials tested are set forth in Table IV. As can be seen from an examination of Table IV, the water-soluble polyalkylene oxides tested ranged in molecular weight from 200 to 2,916. In addition, as indicated in Table IV, tests were made of ethylene glycol, starch and sucrose.

The results of the adsorption tests carried out employing the materials listed in Table IV in the surfactant solution are set forth in Tables V-A through V-I. Tables V-A through V-C report the results employing Pluronic L-62, Pluronic L-64, and polypropylene glycol 2025, respectively, each added in a concentration of 0.3 weight percent. Tables V-D and V-E report the results employing methoxypolyethylene glycol 1250 and polyethylene glycol 200, respectively, each in concentrations of 0.5 weight percent. The results for 0.56 weight percent ethylene glycol are shown in Table V-F and Table V-G shows the results for Brij 58 in a concentration of 0.3 weight percent. Tables V-H and V-I show the results for 0.2 weight percent starch and 0.5 weight percent sucrose, respectively. In each of the experiments summarized in Tables V-A through V-I, the surfactant system employed had a nominal ratio of T-33/CO-520 of 1.5. The surfactant and the organic materials set forth in Table IV were employed in an 8 percent brine solution as described previously.

TABLE IV

| Commercial Name | Manufacturer | Chemical Name | Molecular Weight | Structural Formula |
|---|---|---|---|---|
| Pluronic L-64 | BASF Wyandotte | Block Polymer of Polypropylene Glycol and Polyethylene Glycol (40% Polyethylene Glycol) | 2916 | $HO(CH_2CH_2O)_a(CHCH_2O)_b(CH_2CH_2O)_cH$ <br> $\qquad\qquad\qquad\qquad\ \ |$ <br> $\qquad\qquad\qquad\qquad CH_3$ |
| Pluronic L-62 | BASF Wyandotte | Block Polymer of Polypropylene Glycol and Polyethylene Glycol (20% Polyethylene Glycol) | 2188 | $HO(CH_2CH_2O)_a(CHCH_2O)_b(CH_2CH_2O)_cH$ <br> $\qquad\qquad\qquad\qquad\ \ |$ <br> $\qquad\qquad\qquad\qquad CH_3$ |
| Polypropylene Glycol 2025 | Union Carbide | Polymer of Propylene Glycol | 2025 | $\quad\ OH\qquad\ CH_3$ <br> $\quad\ \ |\qquad\quad |$ <br> $CH_3CHCH_2O(CH_2CHO)_nH$ |
| Methoxypolyethylene Glycol 1250 | Union Carbide | Methoxy Derivative of Polyethylene Glycol | 1250 | $CH_3OCH_2CH_2O(CH_2CH_2O)_nH$ |
| Polyethylene Glycol 200 | Union Carbide | Polymer of Ethylene Glycol | 200 | $HOCH_2CH_2O(CH_2CH_2O)_nH$ |
| Ethylene Glycol | Baker | 1-2 dihydroxyethane | 62 | $HOCH_2CH_2OH$ |
| Brij 58 | Atlas Chemical Ind. | Polyoxyethylene Cetyl Ether | 1122 | $C_{16}H_{33}OCH_2CH_2O(CH_2CH_2O)_{20}H$ |

TABLE IV-continued

| Commercial Name | Manufacturer | Chemical Name | Molecular Weight | Structural Formula |
|---|---|---|---|---|
| Starch | Baker | Amylose α D-Glucoside Polymer | — | 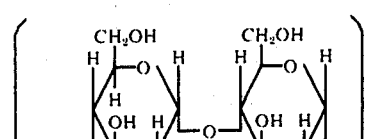 |
| Sucrose | Baker | α D-Glucoside-β-D-Fructoside | 342 | 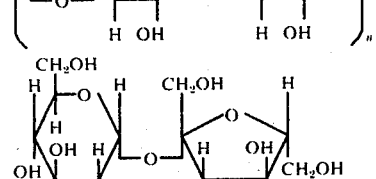 |

TABLE V-A

| Initial Concentration, ppm | | | Reservoir Sand Final Concentration, ppm | | | Adsorption, mg/m² | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 602.1 | 405.4 | 1007.5 | 135.7 | 139.9 | 275.6 | 0.19 | 0.11 | 0.30 | 1.49 | 0.97 |
| 1221.1 | 806.3 | 2027.4 | 576.6 | 483.3 | 1059.9 | 0.26 | 0.13 | 0.39 | 1.51 | 1.19 |
| 3018.9 | 2033.4 | 5052.3 | 2747.5 | 1744.8 | 4492.3 | 0.11 | 0.12 | 0.23 | 1.48 | 1.57 |
| 5936.0 | 4056.2 | 9992.2 | 5529.0 | 3838.7 | 9367.7 | 0.17 | 0.09 | 0.26 | 1.46 | 1.44 |
| 8954.9 | 6003.0 | 14957.9 | 8140.8 | 5440.2 | 13581.0 | 0.33 | 0.23 | 0.56 | 1.49 | 1.50 |
| 12075.5 | 8135.5 | 20211.0 | 11329.3 | 7535.3 | 18864.6 | 0.30 | 0.24 | 0.54 | 1.48 | 1.50 |
| | | | | | | | | Avg. 0.38 | | |

TABLE V-B

| 602.1 | 405.4 | 1007.5 | 25.4 | 34.2 | 59.6 | 0.23 | 0.15 | 0.38 | 1.49 | 0.74 |
|---|---|---|---|---|---|---|---|---|---|---|
| 1221.1 | 806.3 | 2027.4 | 474.9 | 364.3 | 839.2 | 0.30 | 0.18 | 0.48 | 1.51 | 1.30 |
| 3018.9 | 2033.4 | 5052.3 | 1763.8 | 943.9 | 2707.7 | 0.51 | 0.44 | 0.95 | 1.48 | 1.87 |
| 5936.0 | 4056.2 | 9992.2 | 5461.1 | 3794.4 | 9255.5 | 0.19 | 0.11 | 0.30 | 1.46 | 1.44 |
| 8954.9 | 6003.0 | 14957.9 | 8140.8 | 5312.6 | 13453.4 | 0.33 | 0.28 | 0.61 | 1.49 | 1.53 |
| 12075.5 | 8135.5 | 20211.0 | 11397.1 | 8169.6 | 19566.7 | 0.28 | 0 | 0.28 | 1.48 | 1.40 |
| | | | | | | | | Avg. 0.50 | | |

TABLE V-C

| 602.1 | 405.4 | 1007.5 | 25.4 | 37.4 | 62.8 | 0.23 | 0.15 | 0.38 | 1.49 | 0.68 |
|---|---|---|---|---|---|---|---|---|---|---|
| 1221.1 | 806.3 | 2027.4 | 610.6 | 350.7 | 961.3 | 0.25 | 0.19 | 0.44 | 1.51 | 1.74 |
| 3018.9 | 2033.4 | 5052.3 | 2204.8 | 1319.1 | 3523.9 | 0.33 | 0.29 | 0.62 | 1.48 | 1.67 |
| 5936.0 | 4056.2 | 9992.2 | 5257.6 | 3310.8 | 8568.4 | 0.28 | 0.30 | 0.58 | 1.46 | 1.59 |
| 8954.9 | 6003.0 | 14957.9 | 8208.6 | 5436.6 | 13645.2 | 0.30 | 0.23 | 0.53 | 1.49 | 1.51 |
| 12075.5 | 8135.5 | 20211.0 | 11057.9 | 7276.4 | 18334.3 | 0.41 | 0.35 | 0.76 | 1.48 | 1.52 |
| | | | | | | | | Avg. 0.55 | | |

TABLE V-D

| Initial Concentration, ppm | | | Reservoir Sand Final Concentration, ppm | | | Adsorption, mg/m² | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 610.6 | 411.3 | 1021.9 | 79.7 | 60.0 | 139.7 | 0.22 | 0.14 | 0.36 | 1.48 | 1.33 |
| 1178.0 | 802.1 | 1980.1 | 686.9 | 375.0 | 1061.9 | 0.20 | 0.17 | 0.37 | 1.47 | 1.83 |
| 3086.0 | 1989.0 | 5075.0 | 2510.1 | 1510.2 | 4020.3 | 0.23 | 0.19 | 0.42 | 1.55 | 1.66 |
| 6190.0 | 4154.0 | 10344.0 | 5172.8 | 3251.6 | 8424.4 | 0.41 | 0.37 | 0.78 | 1.49 | 1.59 |
| 8395.0 | 5714.0 | 14109.0 | 8208.6 | 4684.9 | 12893.5 | 0.08 | 0.42 | 0.50 | 1.47 | 1.75 |
| 11872.0 | 8112.0 | 19984.0 | 10820.5 | 7658.1 | 18478.6 | 0.43 | 0.18 | 0.61 | 1.46 | 1.41 |
| | | | | | | | | Avg. 0.51 | | |

TABLE V-E

| | | | | | | | | | | |
|---|---|---|---|---|---|---|---|---|---|---|
| 610.6 | 411.3 | 1021.9 | 6.8 | 16.0 | 22.8 | 0.25 | 0.16 | 0.41 | 1.48 | 0.43 |
| 1178.0 | 802.1 | 1980.1 | 20.4 | 28.1 | 48.5 | 0.47 | 0.31 | 0.78 | 1.47 | 0.73 |
| 3086.0 | 1989.0 | 5075.0 | 907.4 | 263.8 | 1171.2 | 0.89 | 0.70 | 1.59 | 1.55 | 3.44 |
| 6190.0 | 4154.0 | 10344.0 | 4138.4 | 1951.0 | 6089.4 | 0.83 | 0.90 | 1.73 | 1.49 | 2.12 |
| 8395.0 | 5714.0 | 14109.0 | 6275.2 | 3240.7 | 9515.9 | 0.86 | 1.01 | 1.87 | 1.47 | 1.94 |
| 11872.0 | 8112.0 | 19984.0 | 10447.4 | 5126.1 | 15573.5 | 0.58 | 1.21 | 1.97 | 1.46 | 2.04 |
| | | | | | | | | Avg. 1.36 | | |

TABLE V-F

| | | | | | | | | | | |
|---|---|---|---|---|---|---|---|---|---|---|
| 610.6 | 411.3 | 1021.9 | 17.0 | 12.3 | 29.3 | 0.24 | 0.16 | 0.40 | 1.48 | 1.38 |
| 1178.0 | 802.1 | 1980.1 | 13.6 | 15.7 | 29.3 | 0.47 | 0.32 | 0.79 | 1.47 | 0.87 |
| 3086.0 | 1989.0 | 5075.0 | 466.4 | 103.8 | 570.2 | 1.07 | 0.77 | 1.84 | 1.55 | 4.49 |
| 6190.0 | 4154.0 | 10344.0 | 3663.3 | 1593.5 | 5256.8 | 1.03 | 1.04 | 2.07 | 1.49 | 2.30 |
| 8395.0 | 5714.0 | 14109.0 | 6919.6 | 2775.8 | 9695.4 | 0.6 | 1.19 | 1.25 | 1.47 | 2.49 |
| 11872.0 | 8112.0 | 19984.0 | 11193.6 | 5610.5 | 16804.1 | 0.28 | 1.02 | 1.30 | 1.46 | 2.00 |
| | | | | | | | | Avg. 1.37 | | |

TABLE V-G

| Initial Concentration, ppm | | | Reservoir Sand Final Concentration, ppm | | | Adsorption, mg/m² | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 593.6 | 386.7 | 980.3 | 13.6 | 12.5 | 26.1 | 0.24 | 0.15 | 0.39 | 1.54 | 1.09 |
| 1204.2 | 772.1 | 1976.3 | 20.4 | 21.7 | 42.1 | 0.48 | 0.30 | 0.78 | 1.56 | 0.94 |
| 2985.0 | 1955.4 | 4940.4 | 1126.1 | 650.9 | 1777.0 | 0.76 | 0.53 | 1.29 | 1.53 | 1.73 |
| 5969.9 | 3895.0 | 9864.9 | 4358.7 | 2481.5 | 6840.2 | 0.66 | 0.57 | 1.23 | 1.53 | 1.76 |
| 8954.9 | 5843.5 | 14798.4 | 7530.2 | 4481.7 | 12011.9 | 0.58 | 0.55 | 1.13 | 1.53 | 1.68 |
| 11939.8 | 7758.0 | 19697.8 | 8751.4 | 5788.4 | 14539.8 | 1.30 | 0.80 | 2.10 | 1.54 | 1.51 |
| | | | | | | | | Avg. 1.15 | | |

TABLE V-H

| | | | | | | | | | | |
|---|---|---|---|---|---|---|---|---|---|---|
| 602.1 | 581.3 | 1183.4 | 13.6 | 92.2 | 105.8 | 0.24 | 0.20 | 0.44 | 1.04 | 0.15 |
| 1221.1 | 1020.6 | 2241.7 | 23.7 | 63.0 | 86.7 | 0.49 | 0.39 | 0.87 | 1.20 | 0.38 |
| 2985.0 | 2203.7 | 5188.7 | 593.6 | 217.6 | 811.2 | 0.97 | 0.81 | 1.78 | 1.35 | 2.73 |
| 6105.6 | 4368.3 | 10473.9 | 3392.0 | 1415.4 | 4807.4 | 1.10 | 1.20 | 2.30 | 1.40 | 2.40 |
| 9158.4 | 6374.9 | 15533.3 | 7598.1 | 4095.4 | 11693.5 | 0.63 | 0.93 | 1.56 | 1.44 | 1.86 |
| 12296.0 | 8536.5 | 20832.5 | 10311.7 | 5513.9 | 15825.6 | 0.81 | 1.23 | 2.03 | 1.44 | 1.87 |
| | | | | | | | | Avg. 1.50 | | |

TABLE V-I

| | | | | | | | | | | |
|---|---|---|---|---|---|---|---|---|---|---|
| 602.1 | 405.4 | 1007.5 | 6.8 | 6.4 | 13.2 | 0.24 | 0.16 | 0.40 | 1.49 | 1.06 |
| 1221.1 | 806.3 | 2027.4 | 23.7 | 11.9 | 35.6 | 0.49 | 0.32 | 0.81 | 1.51 | 2.75 |
| 3018.9 | 2033.4 | 5052.3 | 441.0 | 113.2 | 554.2 | 1.05 | 0.78 | 1.83 | 1.48 | 3.90 |
| 5936.0 | 4056.2 | 9992.2 | 2917.1 | 1011.2 | 3928.3 | 1.22 | 1.28 | 2.50 | 1.46 | 2.88 |
| 8954.9 | 6003.0 | 14957.9 | 7191.0 | 3814.0 | 11005.0 | 0.72 | 0.89 | 1.61 | 1.49 | 1.89 |
| 12075.5 | 8133.5 | 20209.0 | 9429.8 | 4701.8 | 14131.6 | 1.08 | 1.40 | 2.48 | 1.48 | 2.01 |
| | | | | | | | | Avg. 1.61 | | |

A comparison of Tables V-A through V-I with Table I-A indicates that the addition of starch and sucrose did not result in any substantial decrease in surfactant adsorption. For the 0.2 weight percent starch solution, the average surfactant adsorption (average of column 9 in Table V-H) was 1.5 compared with an average surfactant adsorption of 1.53 as reported in Table V-A. The average surfactant adsorption for the 0.5 weight percent sucrose solution was actually somewhat higher at 1.61.

As shown in Tables V-E and V-F, the addition of polyethylene glycol 200 and ethylene glycol resulted in a slight decrease in surfactant consumption and the Brij 58 (molecular weight 1122) resulted in a still further but yet modest decrease in surfactant adsorption. The remaining materials tested as indicated in Tables V-A through V-D resulted in significantly lower average surfactant adsorption.

Turning now to the drawing, the curve is a graph of the average surfactant adsorption A from column 9 of Tables V-A through V-G plotted on the ordinate versus the molecular weight MW of the sacrificial agent employed plotted on the abscissa. As can be seen from an examination of the drawing, the average surfactant adsorption for the Igepon T-33 and Igepal CO-520 surfactant systems containing ethylene glycol and the several polyalkylene oxides set forth in Tables V-A through V-G decreases moderately with increasing molecular weight as it approaches the 1200 molecular weight region. It then decreases abruptly for the polyalkylene oxides exhibiting a molecular weight greater than 1200. Thus, in accordance with this invention only those polyalkylene oxides having a molecular weight of at least 1200 are employed as sacrificial agents.

Tables VI-A and VI-B illustrate the results of static adsorption tests carried out employing the polyalkylene oxide, Pluronic L-64, at varying concentrations such that the ratio of the total surfactant system concentration to the Pluronic L-64 concentration was maintained constant at 5 throughout the several total concentrations reported in column 3. Thus the concentration of Pluronic L-64 varied from minimums of about 0.025 weight percent in Table VI-A and .018 weight percent in Table VI-B to a maximum of about .38 weight percent for each of these Tables. Comparing the results in Table VI-A with the results reported in Table V-B it can be seen that the average surfactant adsorption of 0.45 mg/m$^2$ was slightly lower than that reported for Table V-B. While this difference may not be significant because of experimental errors and also because of the slightly lower total initial surfactant concentration for Table VI-A, it will be noted that the amount of Pluronic L-64 employed for the maximum surfactant concentration in Table VI-A was approximately 0.38 percent as compared to 0.3 percent in Table V-B.

As noted previously, the static adsorption test carried out on Berea sand showed this material to be even more adsorptive of the T-33/CO-520 anionic-nonionic surfactant system than the reservoir sand tested. The polyalkylene oxide, Pluronic L-64, was tested as a sacrificial agent on static adsorption tests carried out employing Berea sand. In these tests Pluronic L-64 concentration was adjusted in order to provide a ratio of total surfactant concentration to Pluronic L-64 concentration of 5 similarly as in the tests described previously with respect to Tables VI-A and VI-B.

The results of these adsorption studies carried out on the Berea sand are reported in Tables VII-A and VII-B. In Table VII-A the nominal ratio of anionic to nonionic surfactant was 1.5 and in Table VII-B this ratio was 0.67.

As can be seen from a comparison of Table VII-A with Table II-A and Table VII-B with Table II-B, the addition of the polyalkylene oxide sacrificial agent materially reduced adsorption of the surfactant system. In Table VII-A, the average surfactant adsorption was found to be 1.2 mg/m$^2$ as compared to 3.77 mg/m$^2$ for Table II-A, and in Table VII-B the average surfactant

TABLE VI-A

| Initial Concentration, ppm | | | Reservoir Sand Final Concentration, ppm | | | Adsorption, mg/m$^2$ | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 881.9 | 377.7 | 1259.6 | 6.8 | 9.4 | 16.2 | 0.35 | 0.15 | 0.50 | 2.33 | 0.72 |
| 1187.2 | 767.2 | 1954.4 | 13.6 | 15.4 | 29.0 | 0.48 | 0.31 | 0.79 | 1.54 | 0.88 |
| 2934.1 | 2043.6 | 4977.7 | 2170.9 | 1148.0 | 3318.9 | 0.31 | 0.36 | 0.67 | 1.44 | 1.89 |
| 6139.5 | 3601.0 | 9740.5 | 5393.3 | 3079.3 | 8472.6 | 0.30 | 0.21 | 0.51 | 1.70 | 1.75 |
| 9412.8 | 5563.9 | 14976.7 | 9056.6 | 5389.3 | 14445.9 | 0.14 | 0.07 | 0.21 | 1.69 | 1.68 |
| 11990.7 | 6962.1 | 18952.8 | 12143.3 | 7300.6 | 19443.9 | 0 | 0 | 0 | 1.72 | 1.66 |
| | | | | | | | | Avg. 0.45 | | |

TABLE VI-B

| 381.6 | 519.2 | 900.8 | 6.8 | 9.4 | 16.2 | 0.15 | 0.21 | 0.36 | 0.73 | 0.72 |
|---|---|---|---|---|---|---|---|---|---|---|
| 797.1 | 1027.2 | 1824.3 | 6.8 | 16.0 | 22.8 | 0.32 | 0.41 | 0.73 | 0.78 | 0.43 |
| 1967.4 | 2736.4 | 4703.8 | 373.1 | 236.4 | 609.5 | 0.65 | 1.02 | 1.67 | 0.72 | 1.58 |
| 3866.9 | 5540.1 | 9407.0 | 3409.0 | 4350.0 | 7759.0 | 0.19 | 0.48 | 0.67 | 0.70 | 0.78 |
| 6309.1 | 8185.3 | 14494.4 | 5766.0 | 8116.0 | 13882.0 | 0.22 | 0.03 | 0.25 | 0.77 | 0.71 |
| 8140.8 | 10867.2 | 19008.0 | 8039.0 | 10422.0 | 18461.0 | 0.04 | 0.18 | 0.22 | 0.75 | 0.77 |
| | | | | | | | | Avg. 0.65 | | | adsorption was found to be 1.16 mg/m$^2$ as compared with 2.85 mg/m$^2$ for Table II-B.

TABLE VII-A

| Initial Concentration, ppm | | | Reservoir Sand Final Concentration, ppm | | | Adsorption, mg/m$^2$ | | | Initial Ratio | Final Ratio |
|---|---|---|---|---|---|---|---|---|---|---|
| 1 | 2 | 3 | 4 | 5 | 6 | 7 | 8 | 9 | 10 | 11 |
| T-33 | CO-520 | Total | T-33 | CO-520 | Total | T-33 | CO-520 | Total | | |
| 881.9 | 377.7 | 1259.6 | 332.4 | 327.2 | 659.6 | 1.83 | 0.17 | 2.00 | 2.33 | 1.02 |
| 1187.2 | 767.2 | 1954.4 | 915.8 | 602.4 | 1518.2 | 0.91 | 0.55 | 1.46 | 1.54 | 1.52 |
| 2934.1 | 2043.6 | 4977.7 | 2628.8 | 1751.1 | 4379.9 | 1.02 | 0.97 | 1.99 | 1.44 | 1.50 |
| 6139.5 | 3601.0 | 9740.5 | 6376.9 | 3570.1 | 9947.0 | 0 | 0.11 | 0.11 | 1.70 | 1.79 |
| 9412.8 | 5563.9 | 14976.7 | 9260.2 | 5444.4 | 14704.6 | 0.51 | 0.40 | 0.91 | 1.69 | 1.70 |
| 11990.7 | 6962.1 | 18952.8 | 11905.9 | 6834.7 | 18740.6 | 0.28 | 0.43 | 0.71 | 1.72 | 1.74 |
| | | | | | | | | Avg. 1.20 | | |

TABLE VII-B

| 381.6 | 519.2 | 900.8 | 179.8 | 217.3 | 397.1 | 0.67 | 1.01 | 1.68 | 0.73 | 0.83 |
|---|---|---|---|---|---|---|---|---|---|---|
| 797.1 | 1027.2 | 1824.3 | 568.2 | 722.0 | 1290.2 | 0.76 | 1.02 | 1.78 | 0.78 | 0.79 |
| 1967.4 | 2736.4 | 4703.8 | 1848.6 | 2566.2 | 4414.8 | 0.39 | 0.57 | 0.96 | 0.72 | 0.72 |
| 3866.9 | 5540.1 | 9407.0 | 3731.2 | 5417.6 | 9148.8 | 0.45 | 0.41 | 0.86 | 0.70 | 0.69 |
| 6309.1 | 8185.3 | 14494.4 | 6309.1 | 7962.0 | 14271.1 | 0 | 0.75 | 0.75 | 0.77 | 0.79 |

TABLE VII-B-continued

| 8140.8 | 10867.2 | 19008.0 | 8378.2 | 10595.1 | 18973.3 | 0 | 0.91 | 0.91 | 0.75 | 0.79 |
|---|---|---|---|---|---|---|---|---|---|---|
|  |  |  |  |  |  |  |  | Avg. 1.16 |  |  |

As noted previously, dynamic adsorption experiments were also carried out using the Berea sand and the Bahama oolites as adsorbents In each of these tests, a 0.77 centimeter-ID glass tube one-foot long was employed as a flow tube. The flow tube was filled with the adsorbent material and then saturated with the 8 percent brine solution described previously. The surfactant solution was then injected continuously and the effluent from the flow tube was collected and analyzed for surfactant content. The flow rate of surfactant solution through the tube varied between a minimum of 0.188 cubic centimeters per hour to a maximum of 1.88 cubic centimeters per hour. Analysis of surfactant in the effluent indicated that the rate of adsorption was dependent upon the flow rate with greater adsorption occurring at the lower flow rates.

The results of flow rate experiments carried out on Berea sand and Bahama oolites are illustrated in Table VIII. Column 2 shows the results for Berea sand and columns 3, 4, 5, 6, and 7 show the results for the tests employing Bahama oolites as the adsorbent at different initial surfactant concentrations. In each case, the solvent employed was 8 percent brine as described previously.

From an examination of columns 2 and 3 in Table VIII, it can be seen that the static adsorption tests conform reasonably well to the results obtained from the dynamic adsorption tests. Thus comparison of the total adsorption (in mg/m$^2$) for Berea sand and Bahama oolites shows that adsorption by the Bahama oolites is about 10.9 percent of the adsorption by the Berea sand. Returning to consideration of Tables IA and III, it will be noted that for the static adsorption tests adsorption by the Bahama oolites was about 8.2 percent of the adsorption by the Berea sand.

observed when employing the pretreatment slug as shown in column 7.

In considering this apparent lack of reduction in surfactant adsorption on the Bahama oolite, it will be recalled that for the static tests, the surfactant adsorption in the absence of a sacrificial agent was initially quite low. The adsorption was considerably less than 1 mg of surfactant per m$^2$ of surface area at the maximum surfactant concentration tested of about 2 weight percent. On the other hand, the static surfactant adsorptions for the Berea sand and the reservoir sand were well above one mg/m$^2$ for initial surfactant concentrations of about 2 weight percent as well as for most of the lower surfactant concentrations tested. In addition, it will be recalled that the Berea sand and the reservoir sand both had significant clay contents whereas the Bahama oolite was free of clay. The clay materials in a subterranean formation of course are quite adsorptive.

The differences in results appearing on the test run on the Bahama oolite as compared with those on the Berea sand and reservoir sand would appear to suggest that the present invention like other oil recovery processes involving the addition of chemicals to the injected water is specific with regard to the reservoir involved. Thus, in determining the applicability of the invention to a particular reservoir, static adsorption tests of the type described above normally should first be carried out utilizing rock materials from the reservoir and the particular surfactant system which is to be employed in the surfactant flood. The test results described above indicate that the invention is particularly applicable to those reservoir rock-surfactant systems in which the surfactant adsorption in the absence of sacrificial agent is at least 1.0 mg/m$^2$ of surface area at a 2 percent by weight surfactant concentration.

TABLE VIII

|   | Berea Sand | Bahama Oolites | | | | |
|---|---|---|---|---|---|---|
| 1 | 2 | 3 | 4 | 5 | 6 | 7 |
| Surfactant Conc., ppm | 1988 | 1988 | 9164 | 9473 | 9528 | 9473 |
| Ratio T-33/CO-520 | 2.9/1 | 2.9/1 | 2.01/1 | 1/1 | 1/3.2 | 1/1 |
| Flow Rate cc/hr | 1.88(0.188) | 1.88(0.188) | 0.459 | 0.459 | 0.459 | 0.459 |
| Adsorption, mg/gm | 7.06 | 1.63 | 3.15 | 2.06 | 2.83 | 2.79 |
| Adsorption mg/m$^2$ | 4.69 | 0.51 | 0.98 | 0.64 | 0.89 | 0.87 |

While no static adsorption tests employing the polyalkylene oxide sacrificial agents of the present invention were carried out with the Bahama oolite as adsorbent, a dynamic flow test was conducted with this material. In this test, reported in column 7 of Table VIII, the surfactant solution was preceded by a pretreatment slug containing one weight percent Pluronic L-64 in 8 percent brine. The pretreatment slug was injected in an amount of 0.25 pore volume.

As indicated in Table VIII, the use of the polyalkylene oxide sacrificial agent did not appear to result in any decrease in surfactant adsorption on the Bahama oolite. In fact, as noted by comparison of columns 5 and 7, a moderate increase in surfactant adsorption was observed although adsorption for the slightly greater initial surfactant concentration shown in column 6 was approximately the same as the surfactant adsorption As noted previously, the polyalkylene oxide sacrificial agent employed in the present invention should have a molecular weight of at least 1200. The molecular weight may be considerably higher so long as the product has a significant water solubility, that is, is soluble in water in an amount of at least 0.10 percent. As will be recognized by those skilled in the art, water solubility is a function of the molecular weight as well as a function of the amount of polyethylene oxide and polypropylene oxide units in the product.

The polyalkylene oxide sacrificial agents of the present invention may themselves exhibit surface activity and result in a lowering of the oil-water interfacial tension. For example, Inks et al., "Controlled Evaluation of a Surfactant in Secondary Recovery", Journal of Petroleum Technology, Nov, 1968, pp. 1320–1324, describe a surfactant waterflood test in which Pluronic L-64 was employed as the surfactant. However, in order to arrive at the low oil-water interfacial tensions needed to effect a significant increase in microscopic displacement efficiency, the aqueous surfactant solution should include a surfactant having a molecular weight lower than the molecular weight of the polyalkylene oxide sacrificial agent. In this regard it will be noted that the various prior art surfactant systems proposed for use in low tension waterflooding normally contain surfactants having molecular weights significantly less than 1200. For example, the aforementioned paper by Foster refers to the use of petroleum sulfonates having an average equivalent weight within the range of 350–500. The aforementioned patent to Flournoy et al. which is directed to surfactant systems for use in high calcium ion concentrations does disclose the use of a nonionic surfactant component which may have a molecular weight as high as about 1250. However, it will be noted that both of the anionic surfactant components of the Flournoy et al. system exhibit significantly lower molecular weights.

The subsequently injected surfactant slug may contain any suitable surfactant which will reduce the oil-water interfacial tension to the desired low level. Since the polyalkylene oxide sacrificial agents of the present invention are susceptible to use in the presence of relatively high monovalent and divalent salt concentrations, it normally will be desirable to employ a surfactant which is compatible with this environment. Thus the surfactant slug preferably contains a nonionic surfactant which is not susceptible to precipitation in the presence of divalent ions such as calcium and magnesium ions. As noted previously, multifunctional anionic-nonionic surfactant systems have been found to tolerate high salinities and high divalent ion concentrations and such systems are preferred for use in carrying out the present invention. Particularly desirable systems are those described in the aforementioned application Ser. No. 560,289 by Birk in which the anionic component of the multifunctional surfactant system comprises an amide-linked sulfonate. Such systems enable the attainment of initial oil-water interfacial tensions below the level of 0.003 dyne/cm in the presence of high salinities and high divalent metal ion concentrations. While the interfacial tensions produced by these systems appear to increase with age, year-old solutions still yield values of less than 0.1 dyne/cm. A suitable amide-linked sulfonate is sodium N-methyl-N-oleoyl-taurate employed in the adsorption tests described previously. Other disubstituted taurates may also be used. Suitable disubstituted taurates which may be employed in the present invention are characterized by the formula:

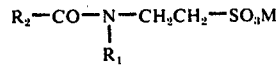

wherein $R_1$ is a methyl or ethyl group, $R_2$ is an aliphatic group containing 12 to 20 carbon atoms, and M is an alkali metal or ammonium ion. For a further description of such amide-linked sulfonates which may be employed in the present invention, reference is made to the aforementioned Birk application.

The polyalkylene oxide sacrificial agent may be employed in any suitable concentration sufficient to satisfy adsorption sites in the reservoir. Preferably, the pretreatment solution will contain the polyalkylene oxide sacrificial agents in a concentration within the range of 0.1–0.5 weight percent. The polyalkylene oxide sacrificial agent may also be present in the surfactant solution. However, when employing the sacrificial agent in the surfactant solution, it normally will be desirable to use a lower concentration than in the pretreatment solution since experimental work has indicated that the presence of the sacrificial agent in the surfactant solution may have an elevating effect upon the oil-water interfacial tension. If the sacrificial agent is employed in the surfactant solution, it preferably should be present in a concentration within a range of 0.05–0.5 weight percent. A preferred class of sacrificial agents for use in the pretreatment solution, and in the surfactant solution if desired, is the group consisting of polyethylene glycols, polypropylene glycols, interpolymers of polypropylene glycols and polyethylene glycols and mixtures thereof. As noted previously, the polyalkylene oxide sacrificial agents should have a molecular weight of at least 1200.

Subsequent to injection of the surfactant solution an aqueous flooding medium is then injected in order to displace the oil in the reservoir to the production wells. The aqueous flooding medium may be any suitable water such as field water which is readily available. If desired, a thickening agent may be employed for mobility control purposes. The thickening agent may be present in the surfactant slug but usually will be added to a slug of water injected immediately after the surfactant slug.

The present invention may be carried out utilizing injection and production systems as defined by any suitable arrangement of wells, as will be readily understood by those skilled in the art. Similarly, displacing fluids employed in the present invention may be injected in any suitable pore volume amounts. By the term "pore volume" is meant the pore volume of the reservoir underlying the well pattern defined by the wells comprising the injection and production systems as explained more fully in the aforementioned Birk application. With respect to the quantities of displacing fluids employed in the present invention, the pretreatment slug typically will be injected in an amount within the range of 0.05–0.2 pore volume. Thereafter the low tension slug is injected in an amount within the range of 0.1–0.3 pore volume. If a separate mobility control slug containing a polymeric thickening agent is employed, this may be injected immediately subsequent to the surfactant slug in an amount within the range of 0.1–0.3 pore volume. Thereafter, additional water is injected as the driving fluid in an amount necessary to carry the displacement process to completion.

We claim:
1. In the recovery of oil from a subterranean oil reservoir penetrated by spaced injection and production systems, the method comprising:
   a. injecting into said reservoir via said injection system an aqueous pretreatment slug containing a water-soluble polyalkylene oxide sacrificial agent having a molecular weight of at least 1200 selected from the group consisting of polyethylene glycols, polypropylene glycols, interpolymers of polypropylene glycols and polyethylene glycols, and mixtures thereof,
   b. thereafter introducing into said reservoir via said injection system an aqueous surfactant slug containing a surfactant having a lower molecular weight than the molecular weight of said polyalkylene oxide, c. introducing into said reservoir via said injection system an aqueous flooding medium to displace reservoir oil to said production system, and d. recovering oil from said production system.

2. The method of claim 1 wherein said surfactant slug contains a water-soluble polyalkylene oxide sacrificial agent having a molecular weight of at least 1200 selected from the group consisting of polyethylene glycols, polypropylene glycols, interpolymers of polypropylene glycols and polyethylene glycols, and mixtures thereof.

3. In the recovery of oil from a subterranean oil reservoir penetrated by spaced injection and production systems, the method comprising:

a. injecting into said reservoir via said injection system an aqueous pretreatment slug containing a water-soluble polyalkylene oxide sacrificial agent having a molecular weight of at least 1200, b. thereafter introducing into said reservoir via said injection system an aqueous surfactant slug containing a surfactant having a lower molecular weight than the molecular weight of said polyalkylene oxide, said surfactant slug also containing a water-soluble polyalkylene oxide sacrificial agent having a molecular weight of at least 1200 and in a concentration within the range of 0.05–0.5 weight percent and lower than the concentration of said polyalkylene oxide sacrificial agent in said pretreatment slug, c. introducing into said reservoir via said injection system an aqueous flooding medium to displace reservoir oil to said production system, and d. recovering oil from said production system.

4. In the recovery of oil from a subterranean oil reservoir penetrated by spaced injection and production systems, the method comprising:

a. injecting into said reservoir via said injection system an aqueous pretreatment slug containing a water-soluble polyalkylene oxide sacrificial agent having a molecular weight of at least 1200, b. thereafter introducing into said reservoir via said injection system an aqueous surfactant slug containing a multifunctional anionic-nonionic surfactant system and comprising a surfactant having a lower molecular weight than the molecular weight of said polyalkylene oxide, c. introducing into said reservoir via said injection system an aqueous flooding medium to displace reservoir oil to said production system, and d. recovering oil from said production system.

5. The method of claim 4 wherein the anionic component of said multifunctional surfactant system comprises an amide-linked sulfonate.

* * * * *